Nov. 13, 1934.  W. B. MacBRIDE  1,980,279
GRIZZLY
Filed Sept. 28, 1932
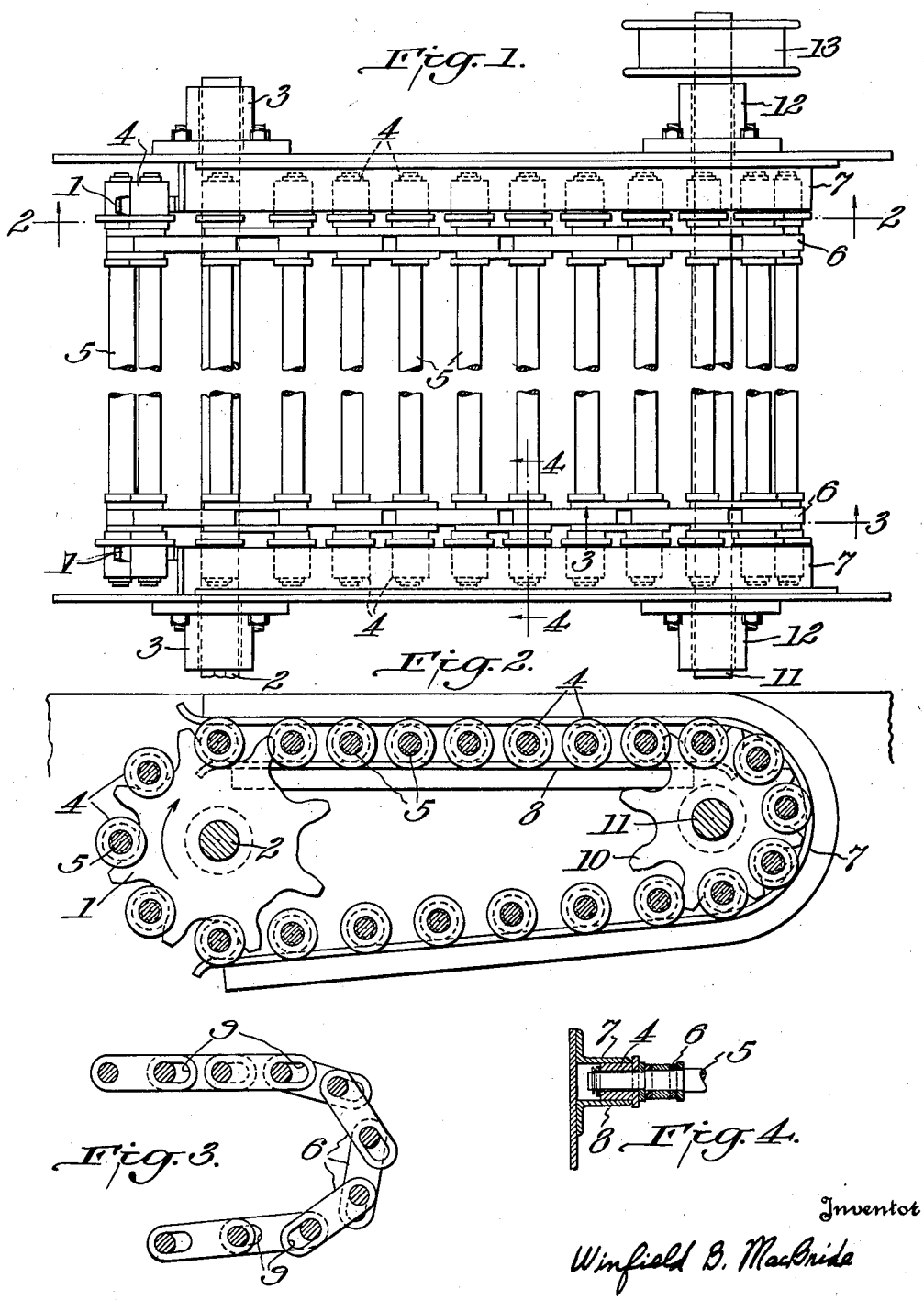
Inventor:
Winfield B. MacBride
By Byrnes, Townsend + Potter
Attorneys.

Patented Nov. 13, 1934

1,980,279

UNITED STATES PATENT OFFICE 1,980,279

GRIZZLY

Winfield B. MacBride, Beaver, Pa., assignor to St. Joseph Lead Company, New York, N. Y., a corporation of New York Application September 28, 1932, Serial No. 635,274

5 Claims. (Cl. 209—307)

This invention relates to screens for grading materials into portions of different sizes of the type known to the art as grizzlies. More particularly, the invention is directed to variable pitch, non-blinding, traveling grizzlies.

Grizzlies are particularly adapted to the separation of large sized materials from the undersizes when handling materials of large size differential. The most troublesome defect in the operation of grizzlies is that known as "blinding". This is caused by the wedging or locking of large pieces of material between the screening members of the grizzly so that a portion of the effective surface of the grizzly becomes blocked off or "blinded". While certain methods for avoiding this defect have been proposed, they have not been effective in practice.

The character of the materials handled by grizzlies is such that the grizzly is subjected to the constant impact of heavy pieces of material. Many of the devices that have been proposed for the elimination of blinding have been practically ineffective because they are positive in their action and because the mechanism is unable to withstand the heavy duty imposed on screens of this type. As a result, maintenance charges on such devices were extremely high.

The principal object of the present invention is the provision of a grizzly which will be non-blinding under all conditions; which will be sufficiently rugged in design to withstand any shocks from larger pieces of material falling upon it or strains arising from choked feeds and chunks hanging up at hopper intersections; which will provide a free flow for the undersize material and a positive discharge for the oversize material; which will require a minimum of head room; and which will present to the oncoming material a constantly shifting bar surface so that the bars will wear uniformly and not become flat or misshapen.

For the purpose of illustration, one embodiment of the invention will be particularly described with reference to the accompanying drawing, in which:

Figure 1 represents a plan view of a grizzly constructed in accordance with the invention;

Figure 2 is a vertical section on line 2—2 of Figure 1;

Figure 3 is a fragmentary section on line 3—3 of Figure 1; and

Figure 4 is a detail in section on line 4—4 of Figure 1.

In the embodiment shown in the drawing, driving sprockets 1 are mounted on the drive shaft 2, which is driven by any suitable motive power through gearing, belting, chains or the like, and rotates in bearings 3.

Sprocket 1 engages rollers 4, into which round bars 5 are loosely inserted, and each assembly of a bar and two rollers is connected to adjacent bars and rollers by means of variable pitch link 6. The rotation of sprocket 1 pushes the assembly forward between rails 7 and 8 which serve to maintain the alignment of the assembly when in motion. It will be observed that the forward movement of the assembly caused by the clockwise rotation of sprocket 1 moves the assembly rollers 4 and bars 5 forward under compression, causing link 6 to slide on bar 5, therefore, bars 5 will assume a minimum pitch between rails 7 and 8, due to the slot 9 in one end of link 6. It will be noted that the travel of the bars between rails 7 and 8 on the top flight of the grizzly is not constant, the assembly hesitating as sprocket 1 disengages from roller 4, until such time as the rotation of sprocket 1 moves forward to the minimum pitch of bars 5 allowed by link 6.

Sprocket 10 is an idler sprocket mounted on idler shaft 11, carried in bearings 12. It will thus be observed that a clean bar surface is always presented to the oncoming materials, the oversize being rejected over sprocket 10 which receives its motive force through the bar and link assembly from sprocket 1. The pitch of sprocket 1 is comparable to the greatest pitch possible with link 6 which is determined by the length of slot 9. This results in increasing the pitch of bars 5 on the bottom flight of the grizzly after sprocket 10 releases the assembly 4, 5 and 6. The purpose of this increase in pitch is to allow a free fall of the materials already passed by the assembly on the top flight. Pieces of irregular shape where the minor dimension would be such as to allow it to pass through the bars on the top flight and which are apt to strike the assembly on the bottom flight falling on one of their major axes, would not fall through the lower part of the assembly unless means were provided to increase the pitch to allow a considerably greater opening between the bars on the bottom flight than on the top flight. The effectiveness of a grizzly, particularly of the traveling type, is largely determined by its ability to reject all the undersize material as well as the oversize. The grizzly described will reject all of the material properly classified, as well as provide means whereby the bars can rotate and present constantly a new face to the materials falling upon the grizzly.

It is important that the pitch of sprocket 10 be the minimum pitch allowed by link 6 and slot 9 in order that this minimum pitch be maintained to such a point that the coarser materials which do not pass through the grizzly assembly on the top flight will not fall through prior to their discharge and contaminate the undersize materials.

Large materials that fall from a considerable height may have a tendency to spread the assembly toward the maximum pitch on the top flight. When handling such materials, and particularly when the fall to the grizzly is considerable, it is advantageous to provide retarder 13 which counteracts any tendency of the assembly to shift from its normal position due to shock rotation of sprocket 10. In the drawing, this retarder is shown as a brake drum to which a suitable spring actuated brake may be applied. Any other suitable means for retarding the rotation of sprocket 10 may be used.

Inasmuch as grizzly bar assemblies 4 and 5 are carried upon rail 8 when receiving their load, no shock consequent to the load reception is transmitted to the sprockets or driving mechanism, and no variation in feed will occur due to varying amounts of sag in the assembly, the device of the invention presenting a constant and level surface of the grizzly at all times.

It is obvious that the grizzly can be installed on an incline with sprocket 10 at a considerably higher elevation than sprocket 1, thereby elevating the material when such elevation is desirable.

Numerous other variations may be made in the construction and arrangement of the grizzly without departing from the scope of the invention as defined by the appended claims.

I claim:

1. A traveling grizzly comprising a plurality of parallel bars, a pair of extensible endless chains engaging the sets of ends of said bars, respectively, to constitute an endless conveying element, driving means for said endless conveying element including a pair of sprockets disposed at each loop of the endless conveying element engaging the bars, the pitch of the teeth of one set of sprockets being greater than the pitch of the other set of sprockets.

2. A traveling grizzly comprising a plurality of parallel bars, a plurality of link members connecting the ends of said bars to constitute an endless conveying element, each of said links having at least one slotted eye; a set of driving sprockets disposed at one loop of said endless conveying element, and a set of idler sprockets with braking means disposed at other loop of said endless conveying element, said sprockets being adapted to force said bars together to the minimum pitch on the top flight and to separate said bars to their maximum pitch on the bottom flight and to retard the speed of the conveying element in the direction from the driving end to the discharge end, and maintain the uniform minimum pitch of said bars while traveling over discharge end.

3. A traveling grizzly comprising a plurality of screening members, extensible means engaging the ends of said members to constitute with said members an endless conveying element, driving means for said endless conveying element including a pair of sprockets disposed at each loop of the endless conveying element engaging the bars, the pitch of the teeth of one set of sprockets being greater than the pitch of the other set of sprockets.

4. A traveling grizzly comprising a plurality of bars, a plurality of link members connecting the ends of said bars to constitute an endless conveying element, each of said links having at least one slotted eye, driving means for said endless conveying element including a pair of sprockets disposed at each loop of the endless conveying element engaging the bars, the pitch of the teeth of one set of sprockets being greater than the pitch of the other set of sprockets.

5. A traveling grizzly comprising a plurality of parallel, elongated, transversely extending screening members, extensible means engaging the ends of said members to constitute therewith an endless conveying element, driving means positioned at one loop of said conveying element, and supporting means positioned at the other loop of said conveying element, said driving means being adapted to push on the top flight and to pull on the bottom flight of said conveying element and said supporting means being adapted to retard the speed of travel of the endless conveying element in the direction from the driving means to the supporting means, whereby that portion of said screening members constituting the bottom flight are separated into positions of mutual remoteness and the portion of said screening members constituting the top flight are forced into positions of mutual proximity.

WINFIELD B. MacBRIDE.